United States Patent [19]

Caselli, Sr.

[11] Patent Number: 4,680,886
[45] Date of Patent: Jul. 21, 1987

[54] LEADERED FISHING LURE HOLDER WITH MEANS FOR RECEIVING LEADER AND HOOKS

[76] Inventor: Joseph M. Caselli, Sr., 2731 NE. 14th St. Causeway, Pompano Beach, Fla. 33062

[21] Appl. No.: 831,486

[22] Filed: Feb. 20, 1986

[51] Int. Cl.⁴ .................................... A01K 97/06
[52] U.S. Cl. ................................ 43/57.1; D22/134
[58] Field of Search ............... 43/57.1, 57.2, 54.1; 242/85.1, 96; 206/63.3, 388; D22/134

[56] References Cited

U.S. PATENT DOCUMENTS

| | | | |
|---|---|---|---|
| D. 218,959 | 10/1970 | Hess | D22/134 |
| 2,514,110 | 7/1950 | Warren | 43/57.1 |
| 2,594,472 | 4/1952 | Melain | 43/57.2 |
| 2,771,704 | 11/1956 | Biggs | 43/57.1 |
| 3,626,495 | 12/1971 | Bastian | 242/85.1 |
| 4,261,529 | 4/1981 | Sandberg | 242/85.1 |
| 4,468,882 | 9/1984 | Marusak | D22/134 |

*Primary Examiner*—Nicholas P. Godici
*Assistant Examiner*—G. M. Reid
*Attorney, Agent, or Firm*—Thomas L. Tully

[57] ABSTRACT

A universal holder for the convenient and safe storage of leadered fishing lures of different types during periods of nonuse. The holder comprises an elongate, narrow, rigid, water-resistant body having opposed ends, each containing a longitudinal recess and at least one end containing at least one bore adjacent one of the recesses, the elongate body also containing an engagement means for the end of the leader. A fishing lure is mounted thereon by inserting the hook(s) thereof into the bore(s) and winding the leader longitudinally around the elongate body and into the opposed recesses sufficiently tightly to prevent the hook from withdrawal from the bore, and securing the end of the leader to the engagement means on the elongate body. The elongate body preferably contains a longitudinal slot for receiving and holding the plurality of hooks of a multi-hook lure, and one or more pairs of opposed slots for the winding of leaders of different types.

6 Claims, 5 Drawing Figures

LEADERED FISHING LURE HOLDER WITH MEANS FOR RECEIVING LEADER AND HOOKS

BACKGROUND OF THE INVENTION

The present invention relates to novel elongate holders for leadered fishing lures of different types, designed to receive and retain such lures neatly and safely during periods of nonuse.

A large variety of leadered fishing lures is available for use in attracting and engaging gamefish of different species and sizes. Most such lures have a monofilament or wire leader which is several feet in length terminating at the tie end with a closed loop for attachment to a fishing line and at the opposite or free end with an attached or integral fish-attracting lure having one or more fish hooks. Generally a sport fisherman will own a plurality of different leadered fishing lures and will have them present in his tackle box when he goes fishing, such as trolling from a boat. Different lures will be selected and secured to the fishing line of a rod and reel assembly, depending upon the species and size of fish which may be present in different areas of the waters being fished.

Because of the length of the leaders and the configuration, sharpness and number of barbed hooks present on the plurality of leadered fishing lures present in a tackle box, such leadered lures can become entangled and can nick each other, causing weakening of the leaders, and also represent a danger to one attempting to segregate the lures due to the sharpness of the barbed hooks and the high possibility of infection of cuts caused thereby.

Frequently fishermen attempt to reduce these problems by enclosing leadered lures within plastic bags or by wrapping them around a cardboard support. However, the problems of leader and hook entanglement, and of injury, remain since the barbed hooks remain exposed for puncture of a plastic bag container and for snagging of and damage to the leaders of adjacent leadered lures and for cutting of hands introduced to the tackle box.

SUMMARY OF THE INVENTION

The present invention relates to novel and relatively simple elongate holders for leadered fishing lures of different types and sizes, which holders are provided with water-resistant bore(s), to receive and retain the pointed end(s) of the fish hook(s) in order to prevent snagging and cutting, and further provided with spaced leader-receiving recesses or longitudinal notches at opposed ends of the elongate body of the holder to permit the long leader to be wrapped around the elongate body and confined within said recesses, and further provided with at least one engagement means for securing the looped end of the leader to the body to prevent loosening. Thus, a leadered fishing lure engaged upon one of the present holders has the pointed ends or barbs of its fish hook(s) securely confined within bore(s), which are water-resistant so as not to promote corrosion, and has its long leader tautly wrapped and secured within the opposed leader-receiving recesses, with the looped end secured to the holder. This provides a compact assembly which is so safe and snare resistant that a plurality of such assemblies can be stored in contact with each other within a tackle box without possibility of entanglement and damage and which can be manipulated freely by the user without any danger of engagement with the hook(s).

Preferably, the present elongate holders are provided with other features which adapt them to use as universal holders for any one of a larger number of leadered fishing lures of different types. For example, the present holders may contain one or more pairs of additional opposed leader-receiving notches along the length of the elongate body, at one side thereof, for purposes of receiving and retaining portions of the length of the leader. Also, the present holders may contain an elongate slot along one side of the elongate body for purposes of receiving and retaining the pointed ends or barbs of one or more hooks of a chain of two or more hooks which are present on some fishing lures. Also, the present holders may contain a plurality of hook-receiving bores at either or both ends of the elongate body for purposes of receiving and retaining each of the pointed ends or barbs of a multi-prong fish hook such as a trident hook.

THE DRAWINGS

Referring to the drawing.

DISCUSSION OF THE DRAWINGS

Figure 1:
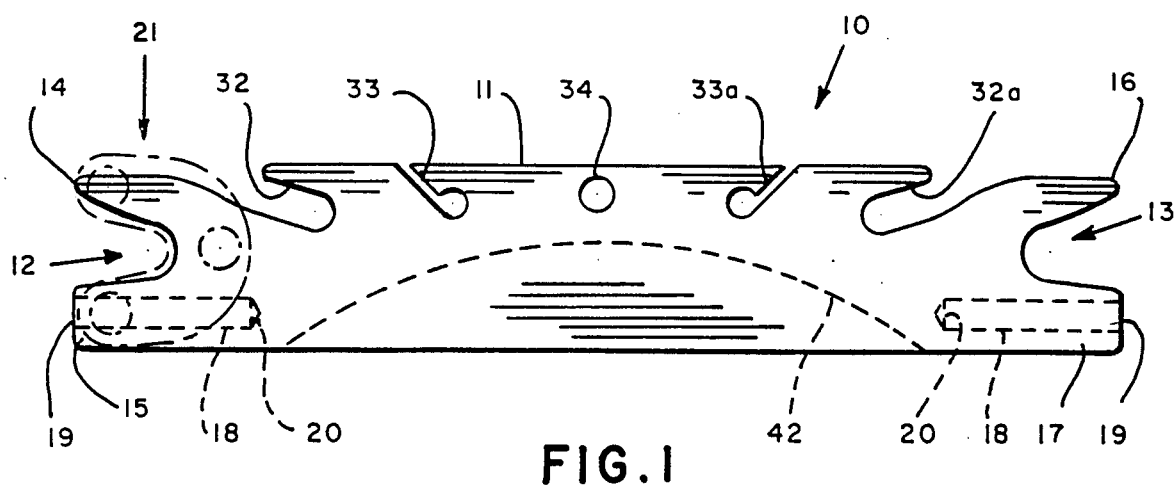
FIG. 1 is a side view of leadered lure holder according to one embodiment of the present invention, a trident hook receptacle being shown therewith by means of broken lines.

The leadered lure holder 10 of FIG. 1 comprises an elongate, rigid water-resistant body 11 such as of molded plastic, aluminum or treated wood, having opposed longitudinal end recesses 12 and 13 or notches between end projections or leg pairs 14 and 15 for recess 12 and 16 and 17 for recess 13. At least one said leg 15, and preferably one leg 15 and 17 of each said pair, as illustrated, is provided with a longitudinal hook-receiving bore 18 of sufficient depth to receive and retain the entire length of the pointed or barbed section of a fish hook so that preferably the curvature or bend portion of the hook engages the body 11, at the mouth 19 of the bore, to support the hook in a position in which the tip or point of the hook is held out of engagement with the floor 20 of the bore 18, to prevent rusting or damage.

Figure 2:
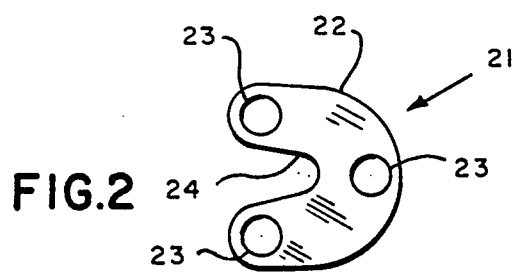
FIG. 2 is a side view of a trident hook receptacle of the type shown in mounted position by means of broken lines in FIG. 1.
Figure 3:
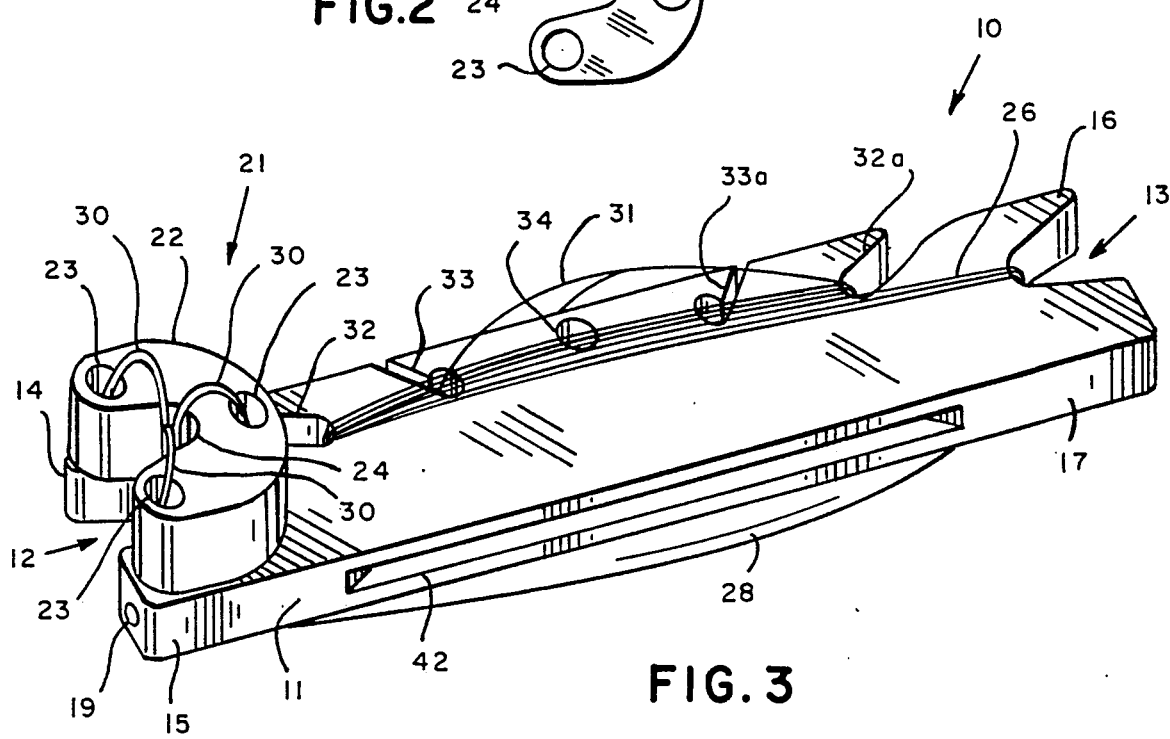
FIG. 3 is a perspective view of the receptacle to FIG. 1 but illustrating a leadered lure with a trident hook assembled thereon.
Figure 4:
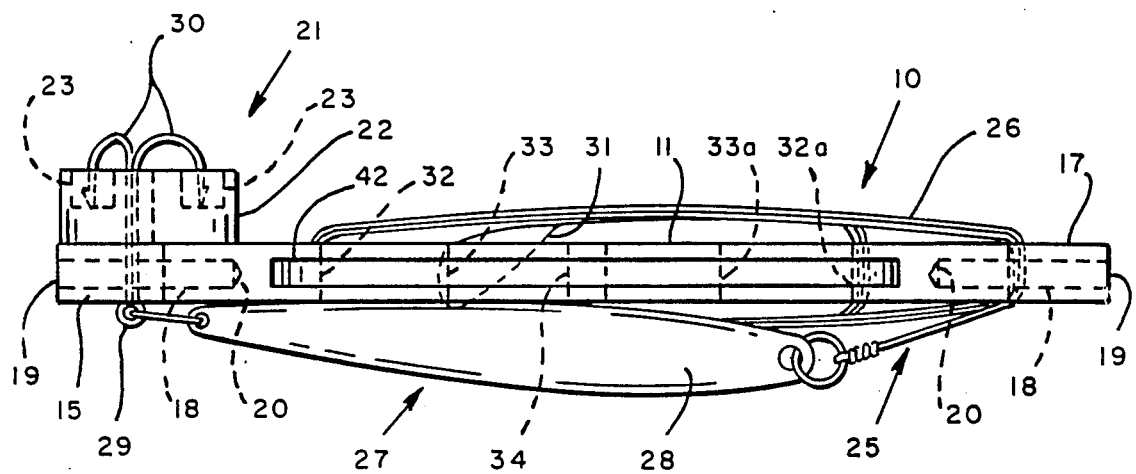
FIG. 4 is a bottom view of the assembly of FIG. 3.

In order to adapt the holder 10 of FIG. 1 to receive and retain a leadered lure having a trident or three-pronged hook, a hook-receiving attachment 21, shown by means of broken lines in FIG. 1 and also shown by FIGS. 2 to 4, is provided. Attachment 21 is formed of material similar to that of the body 10 and, if desired, may be an integral part of body 10. The attachment 21 comprises a body portion 22 provided with a plurality of transverse bores 23 corresponding to the number of prongs present on the hook to be seated therein, and a recess 24 designed to overlie the recess 12 of the holder body 10 and receive the shank of the hook when the prongs of the hook are in seated position, as shown by FIG. 4.

As shown by FIGS. 3 and 4, a leadered lure 25 comprising an elongate monofilament leader 26 of arbitrary length, such as three feet, has a trident hook lure 27 comprising a spoon 28 and a hook 29 with three prongs 30 attached to the free end of the leader 26, and a closed loop 31 knotted at the line-attachment end thereof.

The leadered lure 25 is secured to the lure holder 10 by assembling the body 11 and hook receptacle 21, with notches 12 and 24 aligned, inserting the hook prongs 30 into bores 23 of receptacle 21, drawing the hook shank across the aligned notches and holding the lure spoon 28 against the side of the rigid holder body 11 opposite the side of body 11 against which the receptacle 21 is seated. Thereafter, the elongate leader 26 is wound around the body 11, through the end notch 13 and through a side notch 32 closest to the opposed end notch 12, to avoid drawing the leader over the receptacle 21 and hook 29 through the end notch 12. As shown by FIG. 1, opposed pairs of side notches 32, 32a and 33, 33a are inclined towards the center of the body 11 and are provided for winding the leader 26 when an end notch 12 or 13 is occupied by the shank of a multi-pronged hook, and also for permitting precision winding of leaders of different lengths so that the terminal end of the leader can be sufficiently short that the closed loop 31 can be secured in one of the notches 32 or 33 or through a center hole 34 in the body 11.

In assembled position, the prongs 30 of the hook 29 are secured and housed within the bores 23 of the receptacle 21 so that they cannot snag and nick other lines or cut the fingers. Also, the leader 26 is tautly wound around the body 11 and the end loop 31 is engaged within a side notch 32 or 33 or within the center hole 34 so that no loosening or escape from the notches is possible until the loop 31 is released.

Figure 5:
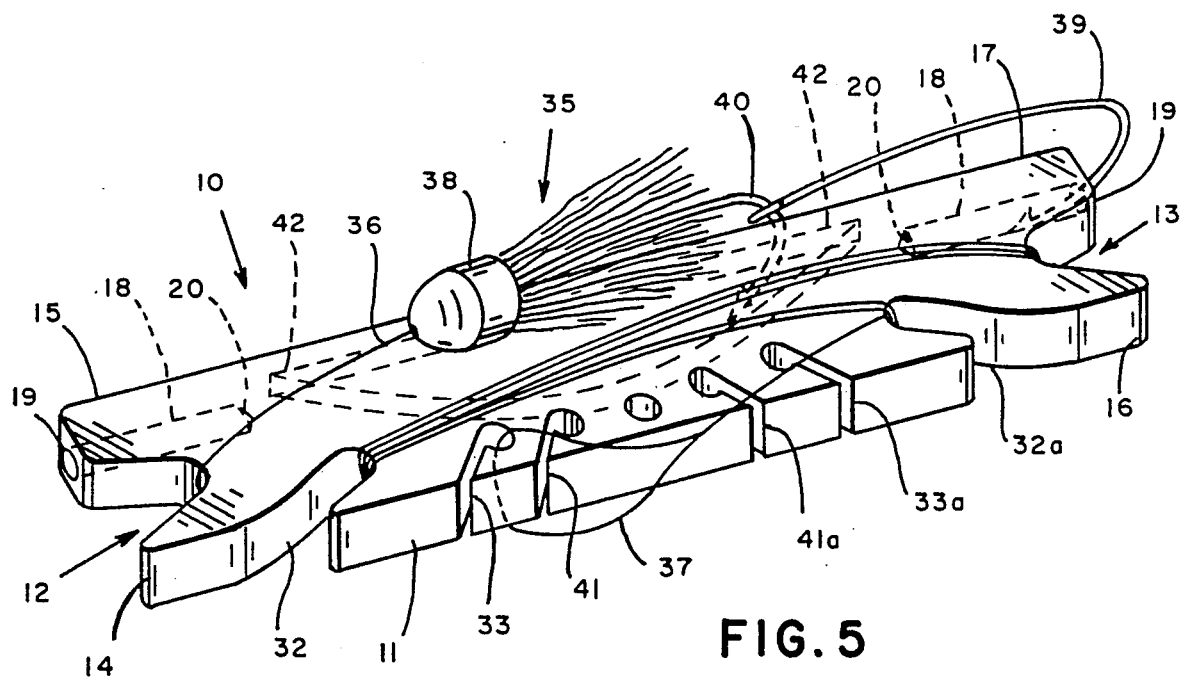
FIG. 5 is a side view of a larger leadered lure holder with a series hook lure assembled thereon.

FIG. 5 illustrates the use of a slightly-longer lure holder 10 to secure a chain hook leadered lure 35 comprising an elongate wire leader 36 having a closed loop 37 at the attachment end and having an ornate lure 38 with chain hooks 39 and 40 attached to the free end thereof. Holder 10 of FIG. 5 is otherwise similar to that of FIGS. 1 to 4 except for an additional pair of side notches 41, 41a and, therefore, the features thereof are numbered similarly to those of FIGS. 1 to 4.

FIG. 5 illustrates the function of the elongate side notch 42 in the attachment of leadered lures having two or more hooks connected to each other or closely spaced at the free end of the leader. As shown, the prong of the end hook 39 is inserted within bore 18 to support the hook on shoulder 19 so that the point or barb of the hook is held spaced from the floor 20 of the bore 18 to prevent damage thereto. Then, the point or barb end of the next hook 40 is pressed into the slot 42 to confine and secure it against snagging or cutting, and the ornate lure 38 is held against the side of the rigid body 11 while the leader 36 is wound around the body 11, through the opposed longitudinal end slots 12 and 13 and, if necessary, through one or more of the pairs of side notches 32, 32a, 33, 33a and 41, 41a until the length of the terminal end of the leader is sufficiently short to enable the loop 37 to be stretched into engagement within one of the side notches 32, 33 or 41 or over the end projection 14.

In assembled position, the leadered lure 35 of FIG. 5 is secured against loosening and the points or barbs of the hooks 39 and 40 are confined and shielded in a manner to avoid snagging and nicking of adjacent lines or leaders and to avoid cutting of the hands of one reaching into a tackle box containing a plurality of such assemblies.

It will be apparent to those skilled in the sport fishing art that the present leader holders are suitable for use with a plurality of different types of leadered lures to hold such lures securely and safely and yet in a manner which permits ease of attachment and detachment and compact storage.

The present lure holders may be provided in a plurality of different lengths, ranging between about six inches up to 12 or more inches to facilitate their use for assembly with leadered lures of different sizes and types. As mentioned hereinbefore, unitary holders may be provided to accommodate multi-pronged hooks by forming the body, or one end thereof, to have a thickness similar to the length of the shank of the hook. The advantage of separate attachments, such as 21 of FIG. 2, is that different attachments may be provided to accommodate hooks having different numbers and sizes of prongs, all suitable for use with the same elongate lure holder body. The present holders may be sold per se or in assembly with leadered lures or nonleadered lures designed to have leaders attached thereto by the purchaser.

Variations and modifications of the present invention will be apparent to those skilled in the art within the scope of the present claims.

I claim:

1. A universal holder for the safe and convenient storage of a leadered fishing lure comprising an elongate flexible leader having an end loop at one end thereof for attachment to a fishing line and having a fish-attracting lure with at least one fish hook having a pointed end at the free end thereof, said holder comprising an elongate, narrow, rigid, water-resistant body having opposed ends, a longitudinal central notch formed inwardly from each of said ends to provide extensions of said body at both sides of said central notches, at least one of said extensions being provided with at least one longitudinal bore adjacent the notch and extending inwardly from said end to a floor, said bore being designed to receive the pointed end of the fish hook adjacent said floor, said elongate body having elongate side edges, at least one said edge containing an elongate slot designed to receive and hold the pointed ends of additional hooks present on said leadered lure, said elongate slot extending uninterrupted a majority of the length of said edge, said elongate body also containing retainer means for releasably-holding the end loop of the leadered fishing lure, whereby the leadered fishing lure is attachable to said holder by first inserting the pointed end of the hook into said bore at one end of said elongate body, pressing the lure against the side of the elongate body and longitudinally wrapping the flexible leader under tension through the notch at the other end of said body and around said body and notches until the length of the elongated leader is reduced sufficiently to permit the end loop thereof to be releasably-attached to said retainer means.

2. A universal holder according to claim 1 further comprising an attachment receptacle having a plurality of transverse bores for receiving each of the pointed ends of a multi-pronged hook and provided with a notch which is aligned with the notch at one end of said body to receive the shank of a multi-pronged hook having its pointed ends within said bores.

3. A universal holder according to claim 1 in which said elongate body has elongate side edges, at least one said edge containing one or more pairs of opposed notches formed inwardly from said edge and inclined inwardly towards the center of said body to provide additional sites for the winding of said elongate flexible leader.

4. A universal holder according to claim 1 in which said retainer means for holding the end loop of the leadered lure comprises a transverse hole through said body.

5. A combination of a universal holder for the safe and convenient storage of a leadered fishing lure and said lure comprising an elongate flexible leader having an end loop at one end thereof for attachment to a fishing line and having a fish-attracting lure with at least one fish hook having a pointed end at the free end thereof, said combination comprising a said holder having an elongate, narrow, rigid, water-resistant body having opposed ends, a longitudinal central notch formed inwardly from each of said ends to provide extensions of said body at both sides of said central notches, at least one of said extensions being provided with at least one longitudinal bore adjacent the notch and extending inwardly from said end to a floor, said bore receiving therein the pointed end of said one fish hook adjacent said floor, said elongate body having elongate side edges, at least one said edge containing an elongate slot designed to receive and hold the pointed ends of additional hooks present on said leadered lure, said elongate slot extending uninterrupted a majority of the length of said edge, said elongate body also containing retainer means for releasably-holding the end loop of the leadered fishing lure, whereby the leadered fishing lure is attached to said holder by the insertion of the pointed end of the one fish hook into said bore at one end of said elongated body, the flexible leader being wrapped under tension through the notch at the other end of said body and around said body and notches until the length of the elongate leader is reduced sufficiently that the end loop thereof is releasably-attached to said retainer means.

6. The combination of a universal holder and lure according to claim 5 in which said bore is sufficiently narrow and sufficiently deep, relative to the size and shape of the hook to be received therein, that the hook is supportable at the opening of said bore with the pointed end thereof being spaced above the floor of the bore.

* * * * *